United States Patent
Nagy et al.

(10) Patent No.: US 7,920,486 B2
(45) Date of Patent: *Apr. 5, 2011

(54) METHODS AND APPARATUS FOR USE IN ESTABLISHING COMMUNICATIONS FOR VIRTUAL PRIVATE NETWORKING

(75) Inventors: Thomas Charles Nagy, Waterloo (CA); Frederick Chee-Kiong Lai, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/362,639

(22) Filed: Jan. 30, 2009

(65) Prior Publication Data

US 2009/0138962 A1    May 28, 2009

Related U.S. Application Data

(63) Continuation of application No. 11/180,487, filed on Jul. 13, 2005, now Pat. No. 7,505,421.

(60) Provisional application No. 60/666,211, filed on Mar. 29, 2005.

(51) Int. Cl.
*H04L 12/28* (2006.01)
(52) U.S. Cl. ........................................ 370/254
(58) Field of Classification Search ............... None
See application file for complete search history.

(56) References Cited

U.S. PATENT DOCUMENTS

| | | | |
|---|---|---|---|
| 6,603,761 B1 | 8/2003 | Wang et al. | |
| 7,298,702 B1 | 11/2007 | Jones et al. | |
| 7,505,421 B2* | 3/2009 | Nagy et al. | 370/254 |
| 7,532,614 B2* | 5/2009 | Ruyle et al. | 370/352 |
| 7,548,526 B2* | 6/2009 | Oba et al. | 370/331 |
| 7,606,191 B1* | 10/2009 | Breau et al. | 370/328 |
| 2005/0008006 A1 | 1/2005 | Schimper | |
| 2007/0097977 A1* | 5/2007 | Boden et al. | 370/392 |
| 2008/0267096 A1* | 10/2008 | Nakamura et al. | 370/261 |
| 2009/0041058 A1* | 2/2009 | Ikeda et al. | 370/475 |

OTHER PUBLICATIONS

Search Report & Written Opinion for PCT Application PCT/CA2005/001083, Jan. 6, 2006.

(Continued)

*Primary Examiner* — Salman Ahmed
*Assistant Examiner* — Timothy J Weidner
(74) *Attorney, Agent, or Firm* — John J. Oskorep, Esq.

(57) ABSTRACT

A processor of a mobile device operates to establish communications for a communications application by performing the following acts upon invocation of the application when the mobile device is connected in a communication network outside of a private network. Initially, the processor causes a request for a VPN connection with the private network to be communicated, and awaits the establishment of the VPN connection. If the VPN connection is established within a predetermined period of time, the processor operates to receive a private IP address of the private network and cause a request for registration using the private IP address to be communicated to a registration server for the private network. If the VPN connection is not established within the predetermined period of time, the processor causes a request for registration using a public IP address to be communicated to a registration server for the communication network.

20 Claims, 6 Drawing Sheets

OTHER PUBLICATIONS

Hua Zou, "Prototyping SIP-based VoIP Services in Java" Communication Technology Proceedings, 2000, 1395-1399, vol. 2, retrieved from http://www.ifip.or.at/con2000/icct2000/icct440.pdf.

Elin Wedlund, "Mobility Support Using SIP", ACM/IEEE International Conference onWireless and Mobile Multimedia, 1999, pp. 1-7, retrieved from http://www.cs.columbia.edu/_hgs/papers/1999/wowmompaper.pdf.

E. T. Aire, "Implementation Considerations in a SIP based secure Voice over IP Network", 2004, pp. 167-172, vol. 1 Africon, Africa, retrieved form IEEE Xplore.

Chen-Han Lin, "Mobile Intelligent Agent Technologies to Support VoIP Seamless Mobility", Advanced Information Networking and Applications, Mar. 28-30, 2005, pp. 177-180, vol. 2, AINA2005 19th International Conference, retrieved form IEEE Xplore.

Shun-Chao Huang, "SIP Based Mobile VPN for Real-Time Applications", Wireless Communications and Networking Conference, Mar. 13-17, 2005, pp. 2318-2323, vol. 4, retrieved from IEEE Xplore.

International Preliminary Report on Patentability for PCT Application #PCT/CA2005/001083, Jul. 26, 2007.

Ericsson Review No. 3, 2000, Ericsson's Network based IP-VPN Solutions, Ericsson Review, Ericsson, Stockholm, SE, 2000, XP000966163.

Extended European Search Report—EPO Application #05763499.0, 7 May, 2008.

Igor Miladinovic, "Intelligent Network Services in the Time of Network Migration", Telecommunications Network Strategy and Planning Symposium, Jun. 13-16, 2004, pp. 33-38, retrieved form IEEE Xplore.

\* cited by examiner

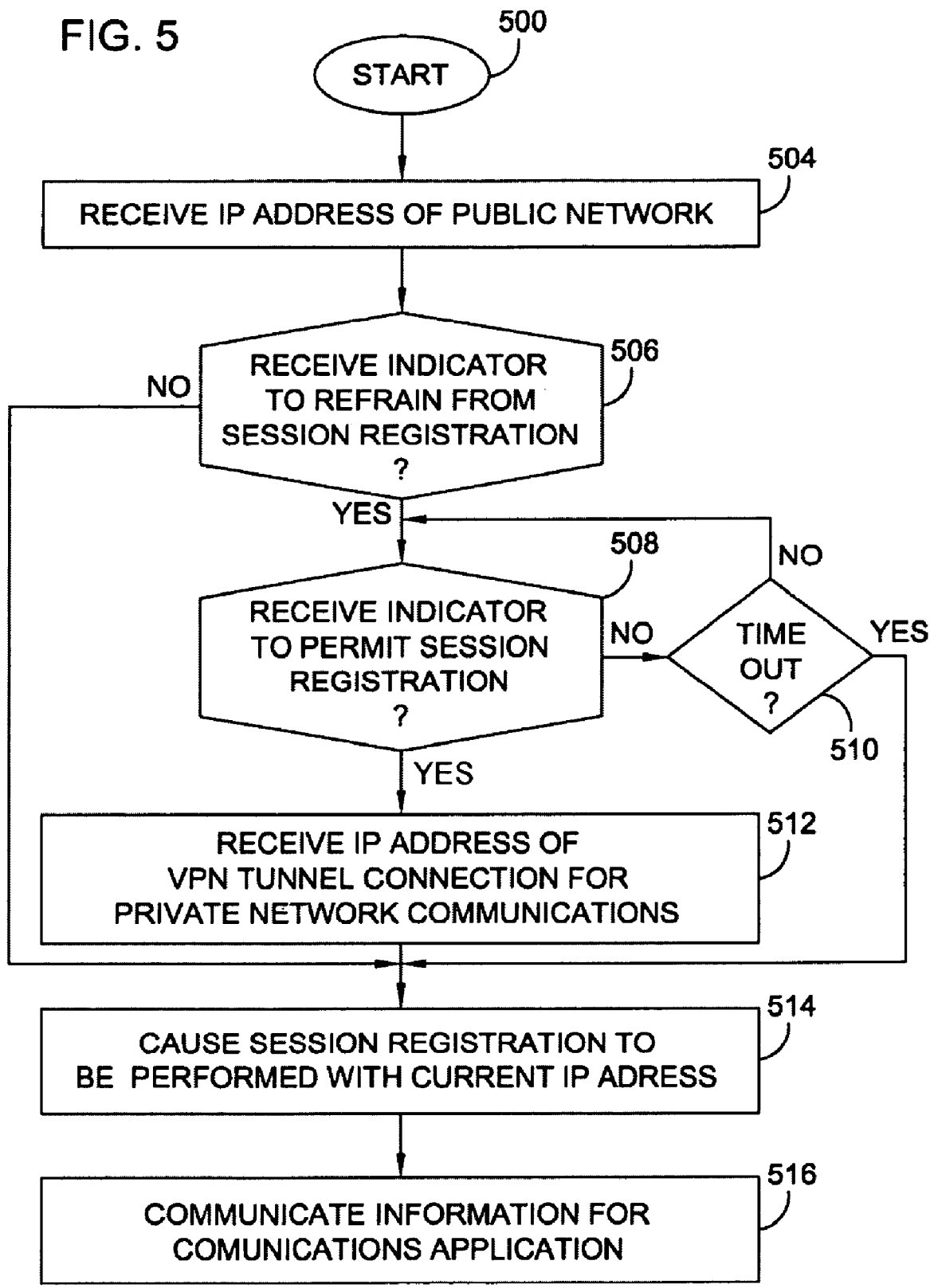

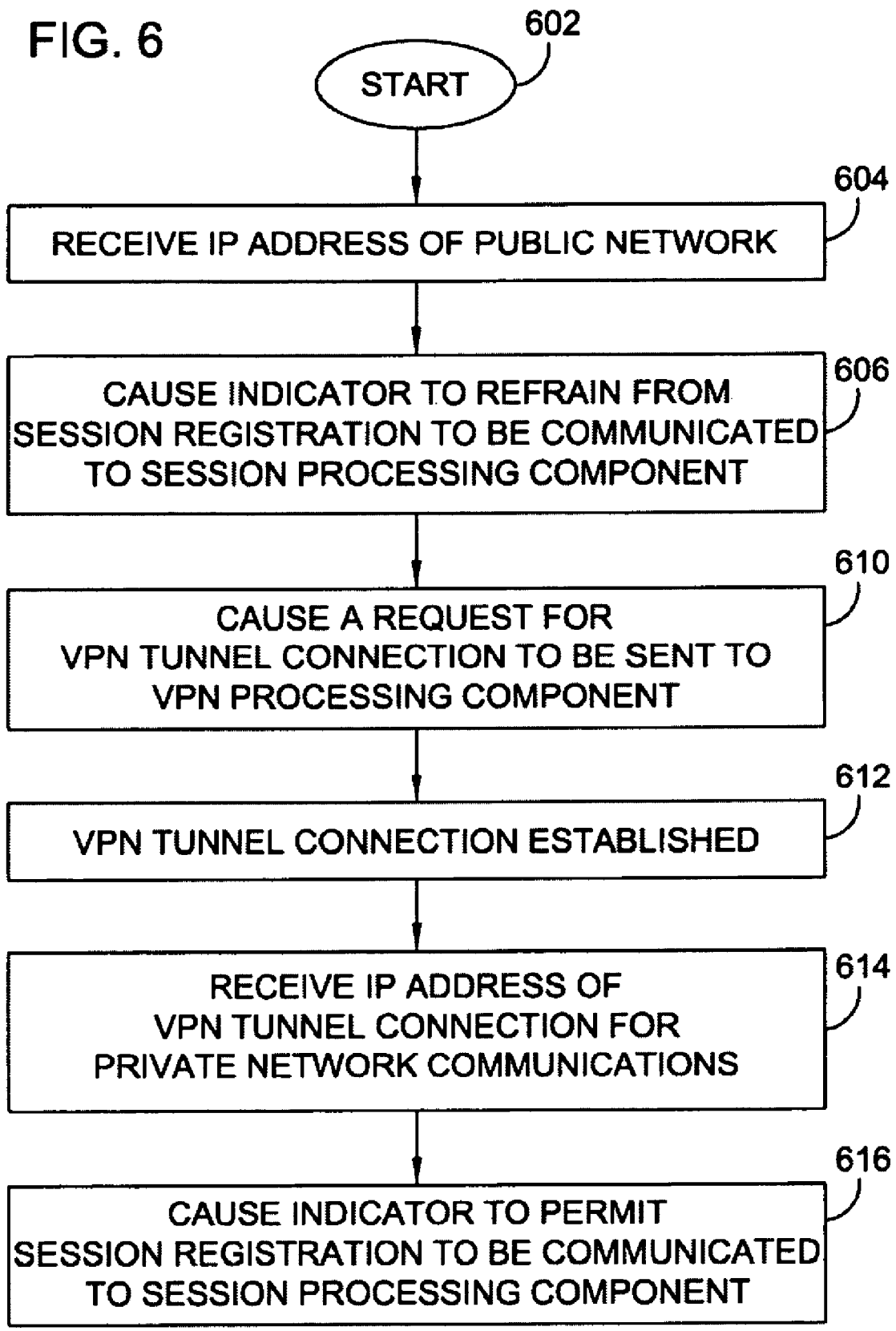

METHODS AND APPARATUS FOR USE IN ESTABLISHING COMMUNICATIONS FOR VIRTUAL PRIVATE NETWORKING

CROSS-REFERENCE TO RELATED APPLICATIONS

The present application is a continuation of and claims priority to U.S. non-provisional patent application entitled "Methods And Apparatus For Use In Establishing Session Initiation Protocol Communications For Virtual Private Networking" having application Ser. No. 11/180,487 and filing date of 13 Jul. 2005, now U.S. Pat. No. 7,505,421 B2, which claims priority to a U.S. Provisional Patent Application having application No. 60/666,211 and filing date of 29 Mar. 2005, which are hereby incorporated by reference herein.

BACKGROUND

1. Field of the Technology

The present application relates to network communications involving a session initiation protocol (SIP) for virtual private networking (VPN), especially for wireless communication devices operating in wireless communication networks.

2. Description of the Related Art

In a wide area network, such as the Internet, terminals connected within it may have unsecured communications. A terminal on the Internet may gain access to a private network using virtual private networking (VPN) techniques, where a secure VPN tunnel connection between the terminal and the private network is established along with an assignment of a private IP address. The VPN negotiation may require authentication through an authentication server in the private network. The authentication may involve a typical logon procedure which includes verification of a username and password which are keyed in by the terminal. This procedure may take some time to complete.

Some communication applications utilized by the terminal, such as Voice over Internet Protocol (VoIP) applications, require the use of a session initiation protocol (SIP). SIP is well-documented in standard documents such as Request For Comments (RFC) 3261.

When the terminal needs to register with a SIP server, it sends a SIP REGISTER instruction to the SIP server. For registration, an IP address needs to be sent to the SIP server so that it can bind a SIP address to the IP address. If the terminal is on the Internet, it is initially assigned with a dynamically-assigned public IP address which will be utilized in the registration process. When a VPN connection for the terminal is subsequently established, however, the terminal will be reassigned with a new private IP address which causes the previously-registered public IP address to be obsolete. This problem is especially apparent when there are at least two SIP servers, one of which is accessible without or outside of the VPN, or at least a single SIP server which is accessible with and without a VPN.

Accordingly, there are needs for methods and apparatus for use in establishing session initiation protocol communications for virtual private networking.

BRIEF DESCRIPTION OF THE DRAWINGS

Embodiments of present invention will now be described by way of example with reference to attached figures, wherein:

FIG. 5 is a flowchart for describing a method for use in establishing SIP communications for virtual private networking (VPN); and FIG. 6 is a flowchart for describing a related method to that described in relation to FIG. 5.

DETAILED DESCRIPTION OF THE PREFERRED EMBODIMENTS

In one illustrative example, a mobile communication device includes a wireless transceiver, one or more processors coupled to the wireless transceiver, and memory for storing a communications application. The communications application may be a VoIP telephony application which involves communication in accordance with a session initiation protocol (SIP). The processor operates to establish the communications for the communications application by performing the following acts upon invocation of the communications application when the mobile communication device is connected in a communication network outside of a private network. Initially, the processor causes a request for a virtual private network (VPN) connection with the private network to be communicated and awaits the establishment of the VPN connection. If the VPN connection is established within a predetermined period of time, the processor operates to receive a private IP address of the private network which is assigned to the mobile communication device and cause a request for registration using the private IP address to be communicated to a registration server for the private network. If the VPN connection is not established within the predetermined period of time, however, the processor cause a request for registration using a public IP address assigned to the mobile communication device to be communicated to a registration server for the communication network. After registration with the registration server, cause the communications to be established.

Figure 1:
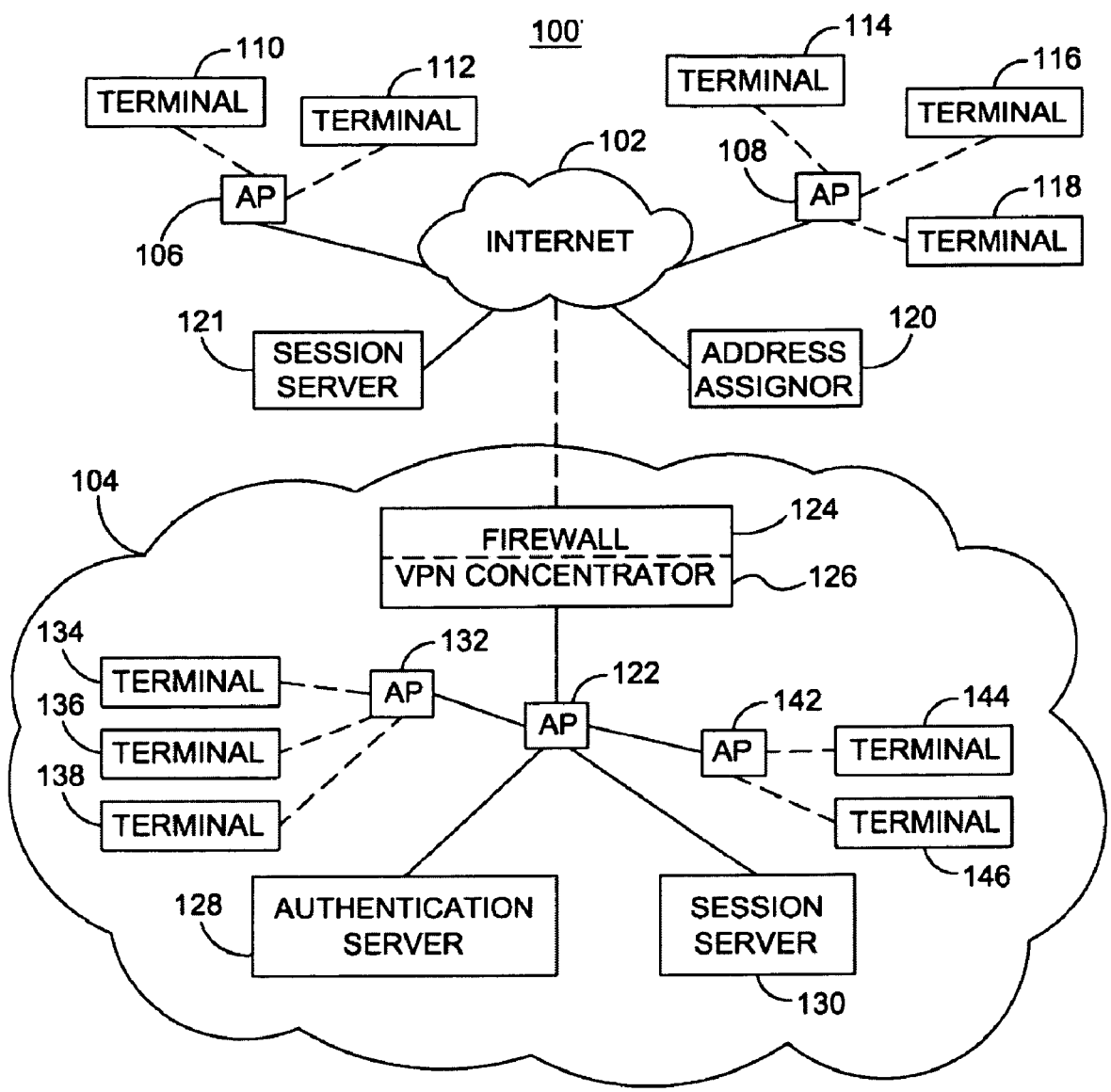
FIG. 1 is a block diagram which illustrates a communication system which includes a private network and a public network in which a mobile communication device requests a virtual private network (VPN) connection within the private network for session initiation protocol (SIP) communications.

FIG. 1 is a block diagram which illustrates a communication system 100 which includes a public network 102 and a private network 104, where terminals in public network 102 may request a virtual private network (VPN) connection to private network 104 for communications. In this example, public network 102 is or includes the Internet. The terminals may connect to their associated networks through access points (APs) as shown. Preferably, at least some of the APs are wireless APs and at least some of the terminals are mobile/wireless communication devices which interface and connect through these wireless APs; such terminals and APs operate in accordance with well-known IEEE 802.11 standards. The terminals shown in public network 102 include terminals 110 and 112 which interface with AP 106, and terminals 114, 116, and 118 which interface with AP 108. The terminals shown in private network 104 include terminals 134, 136, 138 which interface with AP 132, and terminals 144 and 146 which interface with AP 142.

Communication system 100 also includes at least one session server which is a session initiation protocol (SIP) server. In the present embodiment, communication system 100 has a session server 121 in public network 102 and a session server 130 in private network 104. Note that some communication applications utilized by terminals, such as Voice over Internet Protocol (VoIP) applications, require the use of SIP. SIP is well-documented in standard documents such as Request For Comments (RFC) 3261.

Figure 2:
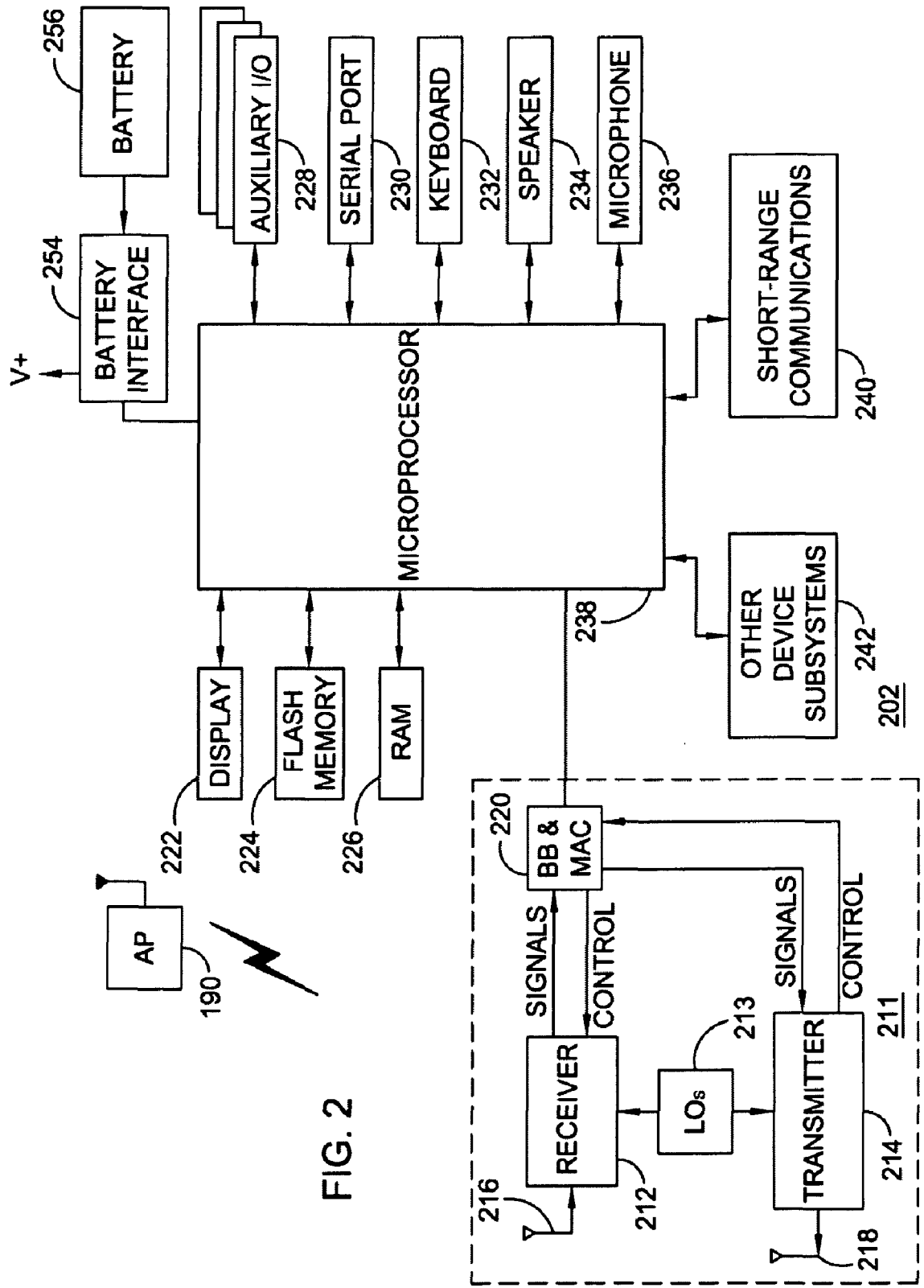
FIG. 2 is a more detailed schematic diagram of the mobile device of FIG. 1, namely, a mobile station of the preferred embodiment.

Referring now to FIG. 2, electrical components of a typical mobile station (MS) 202 (one type of mobile communication device) which operates with wireless APs of communication system 100 of FIG. 1 will be described. Mobile station 202 is preferably a two-way communication device having at least voice and advanced data communication capabilities, including the capability to communicate with other computer systems. Also preferably, mobile station 202 is a wireless communication device which operates in accordance with an IEEE 802.11 standards. Depending on the functionality provided by mobile station 202, it may be referred to as a data messaging device, a two-way pager, a cellular telephone with data messaging capabilities, a wireless Internet appliance, or a data communication device (with or without telephony capabilities).

As shown in FIG. 2, mobile station 202 is adapted to wirelessly communicate with AP 190 which may be a wireless AP of the present application. For communication with AP 190, mobile station 202 utilizes communication subsystem 211. Depending on the type of device, mobile station 202 may also be adapted to wirelessly communicate with other systems such as cellular telecommunication systems. With such configuration, mobile station 202 may be referred to as a "dual mode" mobile station. Although mobile station 202 may have separate and independent subsystems for these purposes, at least some portions or components of these otherwise different subsystems may be shared where possible.

Communication subsystem 211 includes a receiver 212, a transmitter 214, and associated components, such as one or more (preferably embedded or internal) antenna elements 216 and 218, local oscillators (LOs) 213, and a processing module such as a baseband (BB) and media access control (MAC) processing module 220. As will be apparent to those skilled in the field of communications, the particular design of communication subsystem 211 depends on the communication network in which mobile station 202 is intended to operate. In the present application, communication subsystem 211 (including its associated processor/processing components) are operative in accordance with IEEE 802.11 standards.

Mobile station 202 may send and receive communication signals through the network after required network procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in BB/MAC processing module 220. In a similar manner, signals to be transmitted are processed, including modulation and encoding, for example, by BB/MAC processing module 220. These processed signals are input to transmitter 214 for digital-to-analog (D/A) conversion, frequency up conversion, filtering, amplification and transmission through the network via antenna 218. BB/MAC processing module 220 not only processes communication signals, but may also provide for receiver and transmitter control. Note that receiver 212 and transmitter 214 may share one or more antennas through an antenna switch (not shown in FIG. 2), instead of having two separate dedicated antennas 216 and 218 as shown.

Since mobile station 202 is a portable battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown in FIG. 2) that provides power V+ to all of the circuitry.

Mobile station 202 includes a microprocessor 238 (one type of processor or controller) that controls overall operation of mobile station 202. This control includes the communication formatting and operational techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications that control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the wireless device user's corresponding data items stored and/or associated with a host computer system thereby creating a mirrored host computer on mobile station 202 with respect to such items. This is especially advantageous where the host computer system is the wireless device user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication. Short-range communications subsystem 240 of FIG. 2 is an additional optional component that provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Although a specific mobile station 202 has just been described, any suitable mobile communication device or terminal may be part of the inventive methods and apparatus which will be described in fuller detail below. Note that many components of mobile station 202 shown and described may not be included (e.g. a full QWERTY keypad may be optional).

Referring now back to FIG. 1, in a wide area network such as the Internet 102, terminals connected within it (e.g. terminal 110) may have unsecured communications. Terminal 110 on the Internet 102 may gain access to private network 104 using VPN techniques, where a secure VPN tunnel connection between terminal 110 and private network 104 is established along with an assignment of a private IP address. The VPN negotiation may require authentication through an authentication server 128 (e.g. RADIUS server) in private network 104. The authentication may involve a typical logon procedure which includes verification of a username and password which are keyed in at terminal 110. This procedure may take some time to complete.

Some communication applications utilized by terminal 110, such as VoIP applications, require the use of SIP. SIP is well-documented in standard documents such as Request For Comments (RFC) 3261. When terminal 110 needs to register with a SIP server, it sends a SIP REGISTER instruction to the SIP server. For registration, an IP address needs to be sent to the SIP server so that it can bind a SIP address to the IP address. If terminal 110 is on the Internet 102, it is initially assigned with a dynamically-assigned public IP address which will be utilized in the registration process. This assignment is typically performed by address assignor 120 which may be a DHCP server. When a VPN connection is subsequently established, however, terminal 110 will be reassigned with a new private IP address which causes the previously registered public IP address to be obsolete. This problem is especially apparent when there are at least two SIP servers, one of which is accessible without or outside of the VPN, or at least a single SIP server which is accessible with and without a VPN.

A method for use in establishing communications for a mobile communication device (e.g. terminal 110 of FIG. 1) will now be described, alleviating the concerns noted above. Terminal 110 initiates execution of a communications application for communications which require a SIP protocol. The communications application may be, for example, a VoIP telephony application which involves communication in accordance with SIP. However, any suitable communications application such as for video, instant messaging, conference, presence, etc., may be utilized. The communications application may be initiated in response to the end user powering on terminal 110 or invoking the application from terminal 110.

As terminal 110 is located in public network 102 and outside of private network 104, it receives a public IP address which is assigned to terminal 110. This public IP address may be dynamically assigned to terminal 110 by address assignor mechanism 120 (e.g. DHCP server) of public network 102. Alternatively, the IP address may be a static IP address assigned to terminal 110. In any case, however, it is necessary that terminal 110 gain access to private network 104 and therefore it sends a request for a VPN connection to private network 104. This request is handled by a VPN concentrator 126 of a firewall 124 of private network 104. The VPN negotiation may involve authentication through an authentication server 128 (e.g. a RADIUS server) in private network 104. The authentication may involve a typical logon procedure which includes verification of a username and password which are keyed in by terminal 110. Alternatively, terminal 110 may have authentication information stored in memory which is automatically provided to authentication server 128 in private network 104.

Although establishment of a session is needed for the communications, terminal 110 refrains from immediately registering with a session server using the public IP address. For example, terminal 110 refrains from registering with session server 121 in public network 102 with the public IP address. Terminal 110 continues to refrain from registering with the session server with the public IP address even during the VPN negotiation process.

In time, a tunnel connection is established between terminal 110 and private network 104 for VPN. This tunnel connection involves an assignment of a private IP address for terminal 110. After receiving the private IP address, terminal 110 sends a request for session registration using the private IP address to a session server 130 in private network 104. Session server 130 then performs registration procedures to complete the registration, and an e-mail-like address written as a URL is setup for terminal 110 for communications. Subsequently, the communications application on terminal 110 is used to communicate information in accordance with the session protocol.

Figure 3:
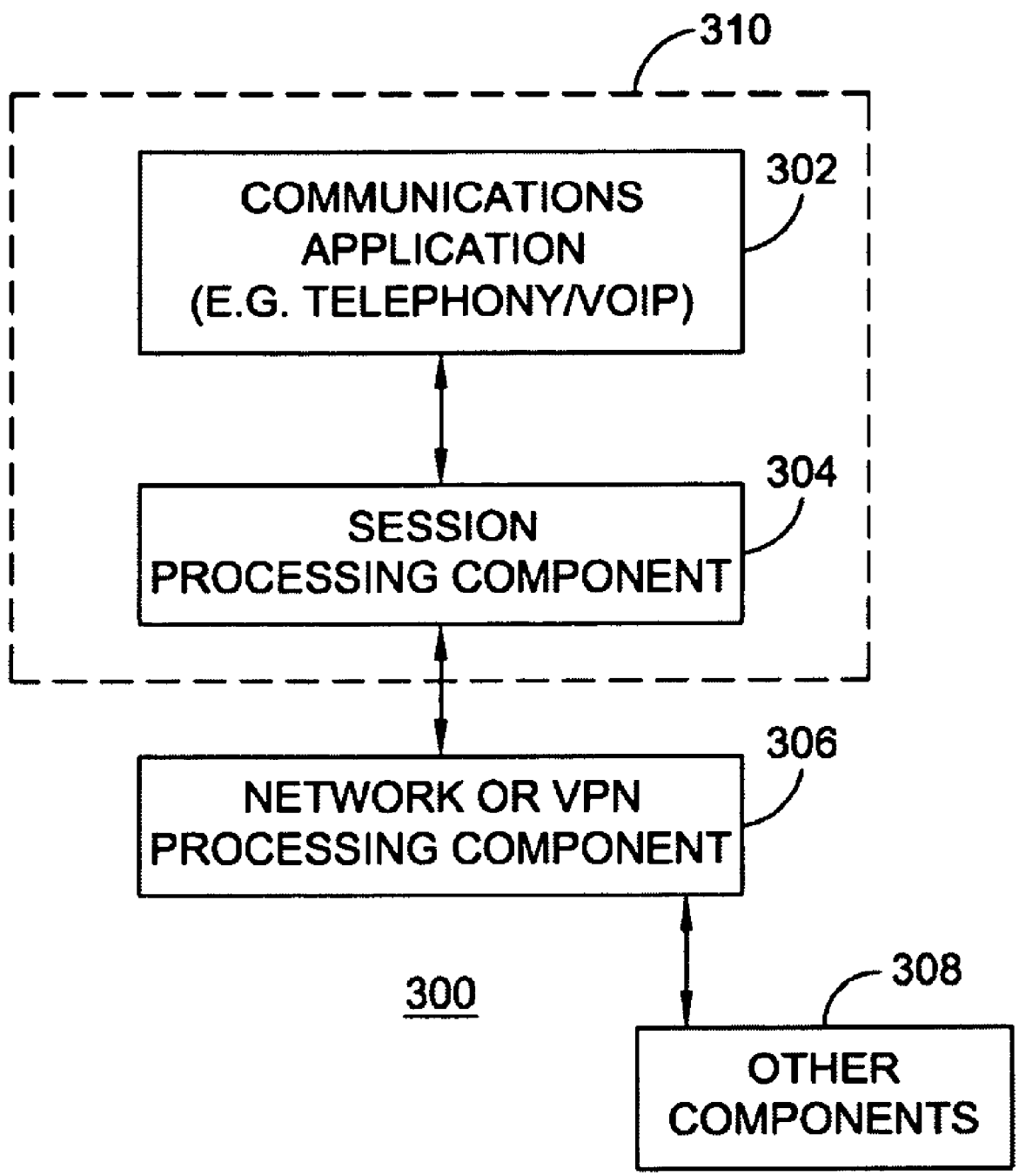
FIG. 3 is a block diagram of software components for the processing utilized in the present application.

More detail regarding the processing components and functionality within the terminal (e.g. mobile communication device) are now described. FIG. 3 is a general block diagram of a few pertinent components 300 of the mobile communication device utilized in the techniques of the present application. Components 300 include a communications application component 302, a session processing component 304, and a network component 306.

Communications application component 302 provides a high-level communications function which is based on an underlying SIP protocol. Communications application component 302 may be a VoIP telephony component, although it could be any other suitable type of communications component (e.g. video, instant messaging, conference, presence, etc.). Session processing component 304 provides SIP session management and handling of session information. Network component 306 provides VPN functionality to handle VPN for the mobile device. Other processing components 308 may be coupled to network processing components 306 as well.

Note that communications application component 302 and session processing component 304 of FIG. 3 may be located or contained in a separate processing component 310 which is functionally or physically separated from network processing component 306 and other processing components 308, although data communication may still take place between these components. This may be the case where a first entity or manufacturer provides communications application component 302 and/or session processing component 304 (or separate processing component 310), and a second entity or manufacturer provides network processing component 306 and/or other processing components 308.

Figure 4:
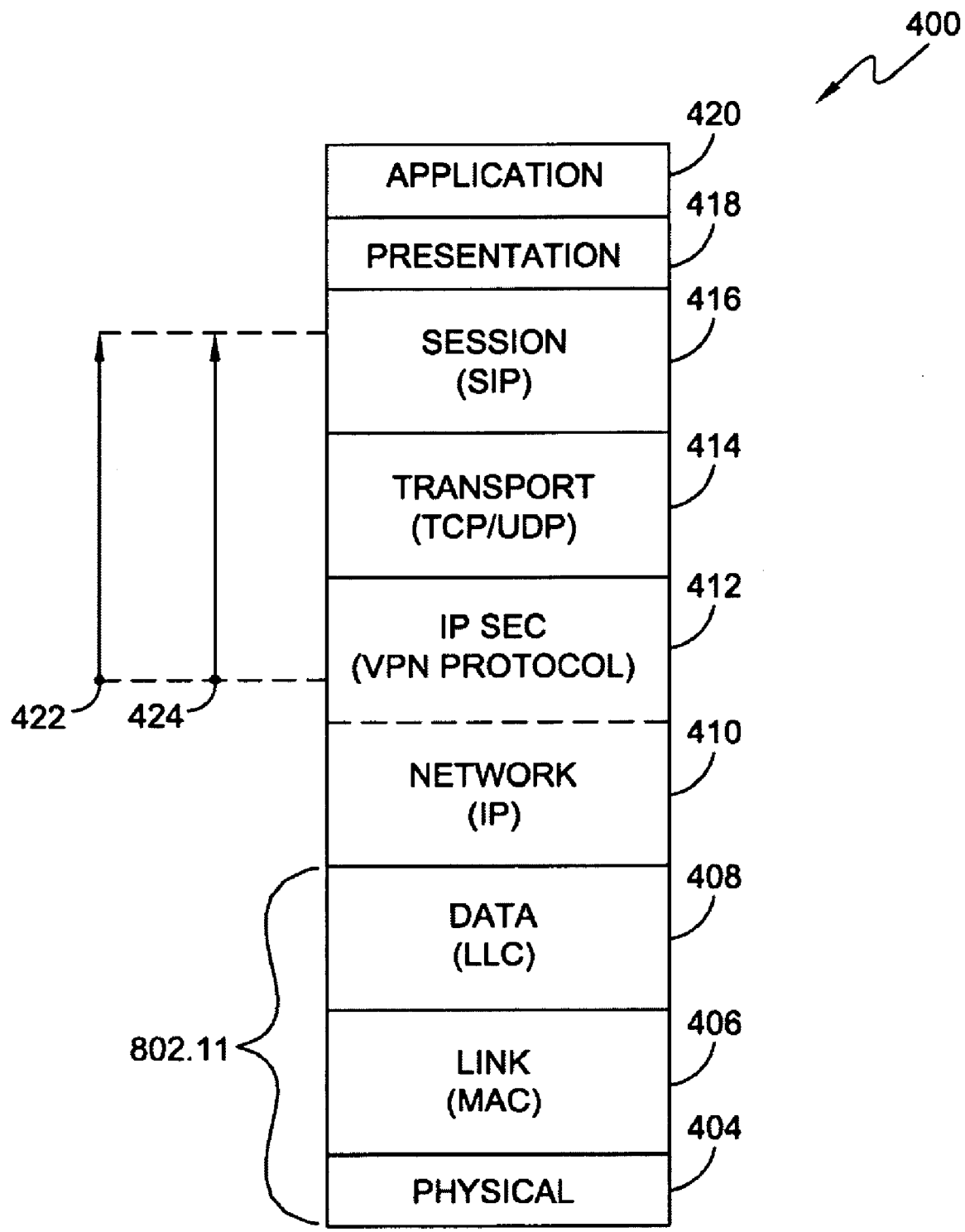
FIG. 4 is an illustrative representation of protocol layers utilized in the mobile device of FIG. 2.

FIG. 4 is an illustrative representation of protocol layers 400 of the mobile communication device of FIG. 2, some of which correspond to the processing components shown and described in relation to FIG. 3. Protocol layers 400 include a physical layer 404, a link layer 406 (for medium access control or MAC), a data layer 408 (for logical link control or LLC), a network layer 410 (for Internet protocol or IP), an IPsec layer 412 which is part of network/IP layer 410 and is utilized for VPN protocols, a transport layer 414 (for transmission control protocol or TCP, or user datagram protocol or UDP), a session protocol layer 416 (for SIP), and an application layer 420 (for communications applications such as the VoIP telephony application). Application layer 420 of FIG. 4 corresponds to communications application component 302 of FIG. 3, session protocol layer 416 of FIG. 4 corresponds to session processing component 304 of FIG. 3, and network layer 410 (which includes IPsec layer) of FIG. 4 corresponds to network/VPN processing component 306 of FIG. 3. Note that physical, link, and data layers 404, 406, and 408 are adapted to function in accordance with the IEEE 802.11 standard.

FIG. 5 is a flowchart for describing a more detailed method for use in establishing session initiation protocol (SIP) communications for virtual private networking (VPN) involving the components and protocol layers described above. The method described is performed by and within the mobile communication device and, in particular, by one or more processors of the mobile communication device. The method of FIG. 5 may be performed by application layer 420 and/or session layer 416 of protocol layers 400 shown in FIG. 4. A computer program product of the present application may include a computer readable medium and computer instructions stored in the computer readable medium which are executable by one or more processors for performing the method.

A triggering mechanism within mobile communication device causes the process steps of FIG. 5 to be initiated. For example, initiation of a communications application for communications which requires a SIP protocol may trigger the process steps of FIG. 5. The communications application may be, for example, a VoIP telephony application which involves communication in accordance with SIP. However, any suitable communications application such as for video, instant messaging, conference, presence, etc., may be utilized. The communications application may be initiated in response to the end user powering on terminal 110 or invoking the application from terminal 110.

Beginning at a start block 500 of FIG. 5, since terminal 110 is located in public network 102 and outside of private network 104, it receives a public IP address assigned to terminal 110 which reaches the session protocol layer (step 504 of FIG. 5). As described earlier, the public IP address may be dynamically assigned to terminal 110 by address assignor mechanism 120 which may be a DHCP server. Alternatively, the IP address may be a static IP address which is assigned to terminal 110.

In any case, a lower protocol layer (e.g. network layer or IPsec layer) of terminal 110 attempts to access to private network 104 by sending a request for a VPN connection to private network 104. As described earlier, the VPN negotiation may involve authentication through an authentication server 128 in private network 104. The authentication may involve a typical logon procedure which includes verification of a username and password which are keyed in by terminal 110. Alternatively, terminal 110 may have authentication information stored in memory which is automatically provided to authentication server 128 in private network 104.

The application layer and session protocol layer of terminal 110 may not be aware of whether a VPN request and negotiation has been made. However, terminal 110 monitors or tests whether an indication to refrain from session registration using the public IP address has been received or identified at the session protocol layer (step 506 of FIG. 5). If the indication has not been identified, terminal 110 sends a request for session registration using the public IP address to a session server (step 514 of FIG. 5). For example, the session server may be session server 121 in public network 102. The session server performs registration procedures to complete the registration, and an e-mail-like address written as a URL is setup for terminal 110 for communications. Subsequently, the communications application on terminal 110 is used to communicate information in accordance with the session protocol (step 516 of FIG. 5).

If the indication to refrain from session registration using the public IP address has been received at the session protocol layer in step 506 of FIG. 5, terminal 110 refrains from registering with a session server using the public IP address. For example, terminal 110 may refrain from registering with session server 121 in public network 102 using the public IP address. Terminal 110 continues to refrain from registering with the session server with the public IP address during the VPN negotiation process.

While refraining from registering, terminal 110 monitors or tests whether a subsequent indication to permit session registration has been received or identified (step 508 of FIG.

5). If this subsequent indication has not been received, then terminal 110 tests whether an expiration of a predetermined time period has occurred (step 510 of FIG. 5). The predetermined time period may be, for example, a time period set between 30 seconds and 5 minutes using a timer. If a time period expiration occurred as tested at step 510, then terminal 110 sends a request for session registration using the public IP address to a session server where the previously-described events occur. If the time period has not expired at step 510, then terminal 110 continues to monitor whether the indication to permit session registration has been received at step 508.

If the subsequent indication to permit session registration has been received at step 508, then the VPN connection with private network 104 has been established and the private IP address associated with the VPN connection and terminal 110 has been received at the session protocol layer (step 512 of FIG. 5). Terminal 110 sends a request for session registration using this private IP address to a session server (step 514 of FIG. 5). For example, the session server may be session server 130 in private network 104. The session server performs registration procedures to complete the registration, and an e-mail-like address written as a URL is setup for terminal 110 for communications. Subsequently, the communications application on terminal 110 is used to communicate information in accordance with the session protocol (step 516 of FIG. 5).

FIG. 6 is a flowchart for describing a related method to that described in relation to FIG. 5. The method described is performed by and within the mobile communication device and, in particular, by one or more processors of the mobile communication device. The method of FIG. 6 may be performed at least in part by network layer 410 or IPsec protocol layer 412 (and/or lower layers below session protocol layer 416) of protocol layers 400 shown in FIG. 4. A computer program product of the present application may include a computer readable medium and computer instructions stored in the computer readable medium which are executable by one or more processors for performing the method.

Prior to the steps outlined in FIG. 6, execution of a communications application for communications which involve a SIP protocol is initiated within terminal 110. The communications application may be, for example, a VoIP telephony application which involves communication in accordance with SIP. However, any suitable communications application such as for video, instant messaging, conference, presence, etc., may be utilized. The communications application may be initiated in response to the end user powering on terminal 110 or invoking the application from terminal 110, as examples.

Beginning at a start block 602 of FIG. 6, since terminal 110 is located in public network 102 and outside of private network 104, it receives a public IP address assigned to terminal 110 at the network layer (step 604 of FIG. 6). The public IP address may be dynamically assigned to terminal 110 by address assignor mechanism 120 which may be a DHCP server. Alternatively, the IP address may be a static IP address which is assigned to terminal 110.

Note that the application layer and the session protocol layer may not be aware of whether any subsequent VPN request and negotiation will be made. Therefore, the network or IPsec protocol layer causes an indicator to refrain from session registration using the public IP address to be communicated to the session protocol layer (step 606 of FIG. 6). This indication may be as simple as a bit flag, or other type of message or instruction. A representation of the communication of this indication is shown in FIG. 4 as an indication 422. In response to identification of this indication, terminal 110 refrains from registering with a session server using the public IP address. For example, terminal 110 may refrain from registering with session server 121 in public network 102 using the public IP address.

The IPsec layer then causes a request for a VPN connection to be sent to private network 104 (step 610 of FIG. 6). The VPN negotiation may involve authentication through authentication server 128 in private network 104. The authentication may involve a typical logon procedure with the end user which includes verification of a username and password which are keyed at by terminal 110. Alternatively, terminal 110 may have authentication information stored in memory which is automatically provided to authentication server 128 in private network 104.

Note that terminal 110 continues to refrain from registering with the session server with the public IP address during the VPN negotiation process. In time, however, the VPN connection with private network 104 is established (step 612 of FIG. 6) and the private IP address associated with the VPN connection and terminal 110 is received by the network or IPsec layer (step 614 of FIG. 6). This private IP address is communicated to the session protocol layer.

After the VPN connection has been established and the private IP address is received, the network or IPsec layer causes an indicator to permit session registration using the private IP address to be communicated to the session protocol layer (step 616 of FIG. 6). This indication may be as simple as a bit flag or other message, and alternatively may be an implicit indication based on the session protocol layer's receipt of the private IP address. A representation of the communication of this indication is shown in FIG. 4 as an indication 424. Identification of this indication will cause terminal 110 to send a request for session registration using the private IP address to a session server. For example, the session server may be session server 130 in private network 104. The session server performs registration procedures to complete the registration, and an e-mail-like address written as a URL is setup for terminal 110 for communications. Subsequently, the communications application on terminal 110 is used to communicate information in accordance with the session protocol.

Note that if no indication to refrain from performing the session registration is communicated to the session protocol layer in step 606 of FIG. 6, or a time out occurs (e.g. see step 510 of FIG. 5), terminal 110 will send a request for session registration using the public IP address to a session server. For example, the session server may be session server 121 in public network 102. The session server performs registration procedures to complete the registration, and an e-mail-like address written as a URL is setup for terminal 110 for communications. Subsequently, the communications application on terminal 110 is used to communicate information in accordance with the session protocol.

Advantageously, SIP registration for VoIP communications is successfully established with the appropriate server for virtual private networking, even in a manner which allows for the separation of functionality and processing components. The terminal no longer registers with the public IP address (unless necessary) prior to being reassigned with the VPN private IP address.

Methods and apparatus for use in establishing session initiation protocol communications for virtual private network have been described. In one illustrative example, a mobile communication device includes a wireless transceiver, one or more processors coupled to the wireless transceiver, memory, and a communications application stored in the memory. The communications application may be a VoIP telephony application which involves communication in accordance with a session initiation protocol (SIP). The one or more processors are operative to receive a public IP address assigned to the mobile communication device in a public network; cause a request for a virtual private network (VPN) connection with a private network to be communicated through the wireless transceiver; refrain from registering with a SIP server with the public IP address; and if the VPN connection is established: receive a private IP address assigned to the mobile communication device for the VPN connection and cause a request for registration using the private IP address to be communicated to a SIP server of the private network through the wireless transceiver. If the VPN connection and the private IP address are not obtained within a specified time period, the session registration is performed using the public IP address. Once registration with the SIP server is completed, the communications are performed in accordance with the SIP. A computer program product of the present application may include a computer readable medium and computer instructions stored in the computer readable medium which are executable by one or more processors for performing the method. The one or more processors may be those incorporated in a mobile communication device.

A "session protocol layer" method of the present application for use in establishing communications for a mobile communication device includes the steps of receiving a public IP address assigned to the mobile communication device in a public network; identifying an indication to refrain from requesting a session registration using the public IP address; in response to identifying the indication, refraining from requesting the session registration using the public IP address; and if a tunnel connection with a private network is established for the mobile communication device: receiving a private IP address associated with the tunnel connection with the private network and causing a request for session registration using the private IP address to be communicated to a session initiation server. If the private IP address is not obtained within a specified time period, the session registration is performed using the public IP address. A computer program product of the present application may include a computer readable medium and computer instructions stored in the computer readable medium which are executable by one or more processors for performing the method. The one or more processors may be those incorporated in a mobile communication device.

A "network layer" method of the present application for use in establishing communications for a mobile communication device includes the steps of receiving a public IP address assigned to the mobile communication device in a public network; producing an indication to refrain from requesting a session registration using the public IP address; causing a request for a tunnel connection to be communicated for establishing a tunnel connection with a private network; and if the tunnel connection with the private network is established: receiving a private IP address associated with the tunnel connection and assigned to the mobile communication device and producing an indication to request a session registration using the private IP address. A computer program product of the present application may include a computer readable medium and computer instructions stored in the computer readable medium which are executable by one or more processors for performing the method. The one or more processors may be those incorporated in a mobile communication device.

The above-described embodiments of the present application are intended to be examples only. Those of skill in the art may effect modifications and variations to the particular embodiments without departing from the scope of the application. The invention described herein in the recited claims intend to embrace all suitable changes in technology.

What is claimed is:

1. A method in a mobile communication device for use in establishing communications with a communications application, the method comprising the following acts which are performed upon invocation of the communications application when the mobile communication device is connected in a communication network outside of a private network:
    causing a request for a virtual private network (VPN) connection with the private network to be communicated from the mobile communication device;
    while the mobile communication device is connected in the communication network and the request for the VPN connection is pending:
        if the VPN connection is established within a predetermined period of time: receiving a private IP address of the private network for assignment to the mobile communication device, and causing a request for registration using the private IP address to be communicated to a registration server for the private network;
        if the VPN connection is not established within the predetermined period of time: causing a request for registration using a public IP address assigned to the mobile communication device to be communicated to a registration server for the communication network; and
    after registration with the registration server, causing communications of the communications application to be established.

2. The method of claim 1, wherein the communication application comprises a Voice over IP (VoIP) communications application.

3. The method of claim 1, wherein the communication network comprises a public network.

4. The method of claim 1, wherein the public IP address is dynamically assigned to the mobile communication device in the communication network.

5. The method of claim 1, wherein the communications application is for communications which utilize a session initiation protocol (SIP).

6. The method of claim 1, wherein the registration server comprises a session initiation protocol (SIP) server.

7. The method of claim 1, comprising the further act of:
    refraining from registering, within the predetermined period of time, with the registration server of the private network using the public IP address.

8. The method of claim 1, wherein a network layer component causes the request for the VPN connection and a session protocol layer component refrains from registering using the public IP address and causes the request for SIP registration using the private IP address, and wherein the network layer component and the session protocol layer component are functionally or physically separate components.

9. The method of claim 1, further comprising:
    after causing the request for the VPN connection with the private network to be communicated, causing data of an authentication procedure for the VPN connection to be transmitted from the mobile communication device.

10. The method of claim 1, which is embodied as computer instructions stored in a non-transitory computer readable medium which are executable by one or more processors of the mobile communication device.

11. A mobile communication device, comprising:
    a wireless transceiver;
    one or more processors coupled to the wireless transceiver;
    memory adapted to store a communications application for communications;
    the one or more processors being operative to establish the communications for the communications application by performing the following acts upon invocation of the communications application when the mobile communication device is connected in a communication network outside of a private network:
cause a request for a virtual private network (VPN) connection with the private network to be communicated via the wireless transceiver;
while the mobile communication device is connected in the communication network and the request for the VPN connection is pending:
if the VPN connection is established within a predetermined period of time: receive, via the wireless transceiver, a private IP address of the private network which is assigned to the mobile communication device, and cause a request for registration using the private IP address to be communicated, via the wireless transceiver, to a registration server for the private network;
if the VPN connection is not established within the predetermined period of time: causing a request for registration using a public IP address assigned to the mobile communication device to be communicated, via the wireless transceiver, to a registration server for the communication network; and
after registration with the registration server, cause the communications to be established.

12. The mobile communication device of claim 11, wherein the communication application comprises a Voice over IP (VoIP) communications application.

13. The mobile communication device of claim 11, wherein the communication network comprises a public network.

14. The mobile communication device of claim 11, wherein the public IP address is dynamically assigned to the mobile communication device in the communication network.

15. The mobile communication device of claim 11, wherein the communications application is for communications which utilize a session initiation protocol (SIP).

16. The mobile communication device of claim 11, wherein the registration server comprises a session initiation protocol (SIP) server.

17. The mobile communication device of claim 11, wherein the one or more processors are further operative to: refrain from registering, within the predetermined period of time, with the registration server of the private network using the public IP address.

18. The mobile communication device of claim 11, wherein a network layer component causes the request for the VPN connection and a session protocol layer component refrains from registering using the public IP address and causes the request for SIP registration using the private IP address, and wherein the network layer component and the session protocol layer component are functionally or physically separate components in the mobile communication device.

19. The mobile communication device of claim 11, wherein the one or more processors are further operative to:
after causing the request for the VPN connection with the private network to be communicated, cause data of an authentication procedure for the VPN connection to be transmitted via the wireless transceiver.

20. The mobile communication device of claim 11, wherein the communications of the communications application are voice telephony communications.

* * * * *